United States Patent Office 3,520,580
Patented July 14, 1970

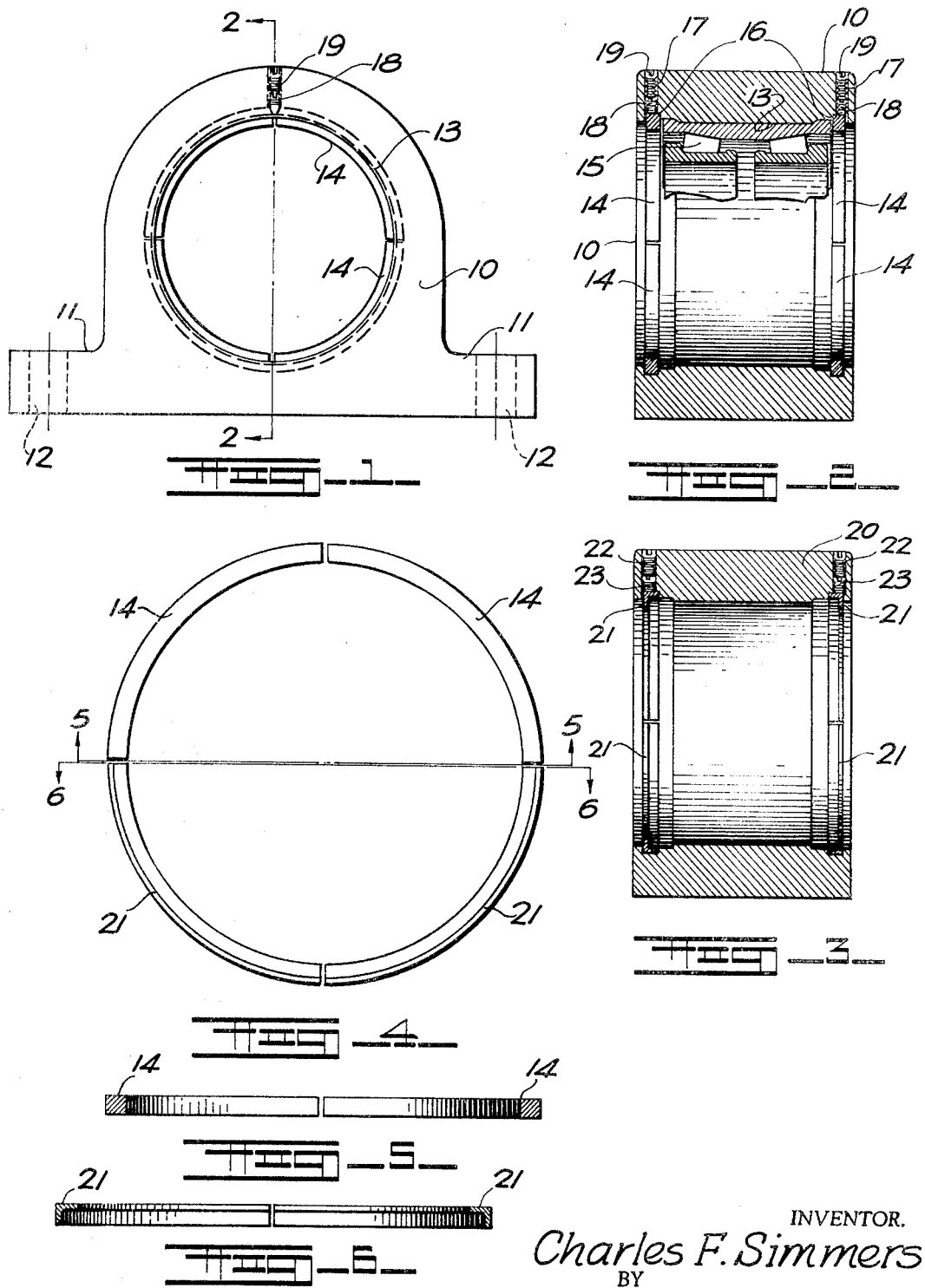

3,520,580
PILLOW BLOCK WITH ANTIFRICTION BEARINGS
Charles F. Simmers, Canfield, Ohio, assignor to U.S. United Enterprises, Inc., Canfield, Ohio, a corporation of Ohio
Filed Sept. 12, 1968, Ser. No. 759,331
Int. Cl. F16c 35/06
U.S. Cl. 308—207                    4 Claims

ABSTRACT OF THE DISCLOSURE

A solid pillow block in the form of a journal for a shaft having a self-contained compact bearing unit positioned therein by several ring segments engaging annular grooves in said solid pillow block and on either side of said bearing unit.

BACKGROUND OF THE INVENTION

Field of the invention

This invention relates to a pillow block of the type used for journaling a shaft for rotation relative thereto.

Description of the prior art

Prior bearing structures of the pillow block type generally termed solid pillow block constructions have received shafts for rotating motion relative thereto directly upon the surfaces of the pillow block and have, therefor, formed friction bearings dependent upon lubrication for successful operation and having an inherent high friction loss.

This invention eliminates such friction loss and provides the solid pillow block with an anti-friction bearing.

SUMMARY OF THE INVENTION

A solid pillow block for receiving and rotatably supporting a shaft or the like and having an annular inner surface in which a self-contained compact antifriction bearing unit is replaceably positioned. The bearing unit being preassembled and prelubricated and capable of exceptionally long life without relubrication or maintenance.

DESCRIPTION OF THE DRAWINGS

FIG. 1 is a plan view of a solid pillow block with ring segment antifriction bearing retaining means installed therein.

FIG. 2 is a vertical section on line 2—2 of FIG. 1, additionally showing an anti-friction bearing.

FIG. 3 is a vertical section similar to FIG. 2 and illustrating an alternate form of ring segment retaining means.

FIG. 4 is a plan view of two types of ring segment retaining means.

FIG. 5 is a cross section on line 5—5 of FIG. 4.
FIG. 6 is a cross section on line 6—6 of FIG. 4.

DESCRIPTION OF THE PREFERRED EMBODIMENT

By referring to the drawings and FIGS. 1 and 2 in particular, it will be seen that a pillow block has been disclosed which includes a unitary apertured body 10 having sidewardly extending lugs 11 thereon which in turn are provided with vertical openings 12. The apertured body 10 defines a transversely extending cross sectionally circular opening 13 which in the usual heretofore pillow block application directly receives the shaft to be journaled thereby.

In the present invention, the opening 13 is provided with configurations on its inner surface defining means for receiving and retaining a plurality of ring segments 14 which ring segments 14 are arranged in a circular pattern and capable in such pattern of positioning a unitary prepackaged antifriction bearing 15. The antifriction bearing 15 is available from such sources as Timken, S K F Industries and Hyatt Division of General Motors Corporation. Such bearings have heretofore been used in other applications and the present invention combines them with the desirable features of a pillow block making many industrial applications of anti-friction bearings possible.

Still referring to FIGS. 1 and 2 of the drawings, it will be seen that the ring segments 14 are positioned individually in grooves 16 which are formed annularly at either side of the pillow block and more specifically the area 13 thereof heretofore referred to. The ring segments 14 upon being so installed are held in installed and bearing retaining position by a plurality of set screws positioned in drilled and tapped openings 17 in the solid pillow block body 10. Each of the openings 17 has a cone pointed set screw 18 positioned therein with the cone point engaged between the ends of a pair of the ring segments 14 and followed by flat point set screws 19 which hold the same in locked position. Thus, the ring segments 14 are expanded by end wise motion applied between their split ends so as to become locked securely in the grooves 17 and thus capable of positioning and holding the bearing units 15 in desirable relation to the solid pillow block.

By referring now to FIG. 3 of the drawings, an alternate form of the ring segments may be seen and wherein the same are of L shaped cross sectional configuration rather than rectangular cross sectional configuration as in the illustration of FIG. 2. The type illustrated in FIG. 3 of the drawings provide a free mounting of the bearing unit permitting relative motion between the bearing unit and the pillow block while the type seen in FIG. 2 of the drawings and heretofore described hold the bearing unit 15 in fixed relation at all times.

In FIG. 3 of the drawings the pillow block body is indicated by the numeral 20, the cross sectionally L shaped ring segments by the numerals 21 and the locking set screws by the numerals 22 and 23.

In FIG. 4 of the drawings, the upper half thereof illustrates two of the ring segments 14 while the lower half illustrates two of the ring segments 21.

FIG. 5 illustrates the cross sectional configuration of the ring segments 14 and FIG. 6 illustrates the cross sectional configuration of the ring segments 21.

From the foregoing, it will be seen that when the self-contained compact preassembled and pregreased bearing unit 15 is installed in the pillow block complete with its seals and end cap etc. the ring segments 14 or 21 are then positioned in the grooves 17 and the set screws 18 and 19 run into position to lock the assembly together the resultant pillow block provides an efficient, inexpensive, quickly assembled antifriction bearing construction suitable for many mechanical and industrial uses where such anti-friction bearings have not heretofore been employed.

Although but two embodiments of the present invention have been illustrated and described, it will be apparent to those skilled in the art that various changes and modifications may be made therein without departing from the spirit of the invention. Having thus described my invention, what I claim is:

1. The combination of a pillow block and an antifriction bearing unit disposed therein for receiving a shaft to be rotatably supported relative thereto, said pillow block having a transverse shaft receiving opening in which said antifriction bearing unit is positioned and a plurality of ring segments engageable in annular grooves in said pillow block, set screws in drilled and tapped openings in said pillow block for engagement between the ends of said ring segments for holding the same in said annular grooves whereby said antifriction bearing unit is secured in said pillow block.

2. The combination set forth in claim 1 and wherein the ring segments are of rectangular cross section.

3. The combination set forth in claim 1 and wherein the ring segments are of cross sectionally L shaped configuration.

4. The combination set forth in claim 1 and wherein the set screws have pointed ends for wedging engagement between the ends of said ring segments.

References Cited

UNITED STATES PATENTS

| 1,778,258 | 10/1930 | Jennings | 308—236 |
| 1,835,991 | 12/1931 | Remge | 308—236 |

FOREIGN PATENTS

| 555,636 | 3/1923 | France. |

MARTIN P. SCHWADRON, Primary Examiner

F. SUSKO, Assistant Examiner